D. SHATTUCK.
Thrashing Machine.
No. 38,538.
Patented May 12, 1863.
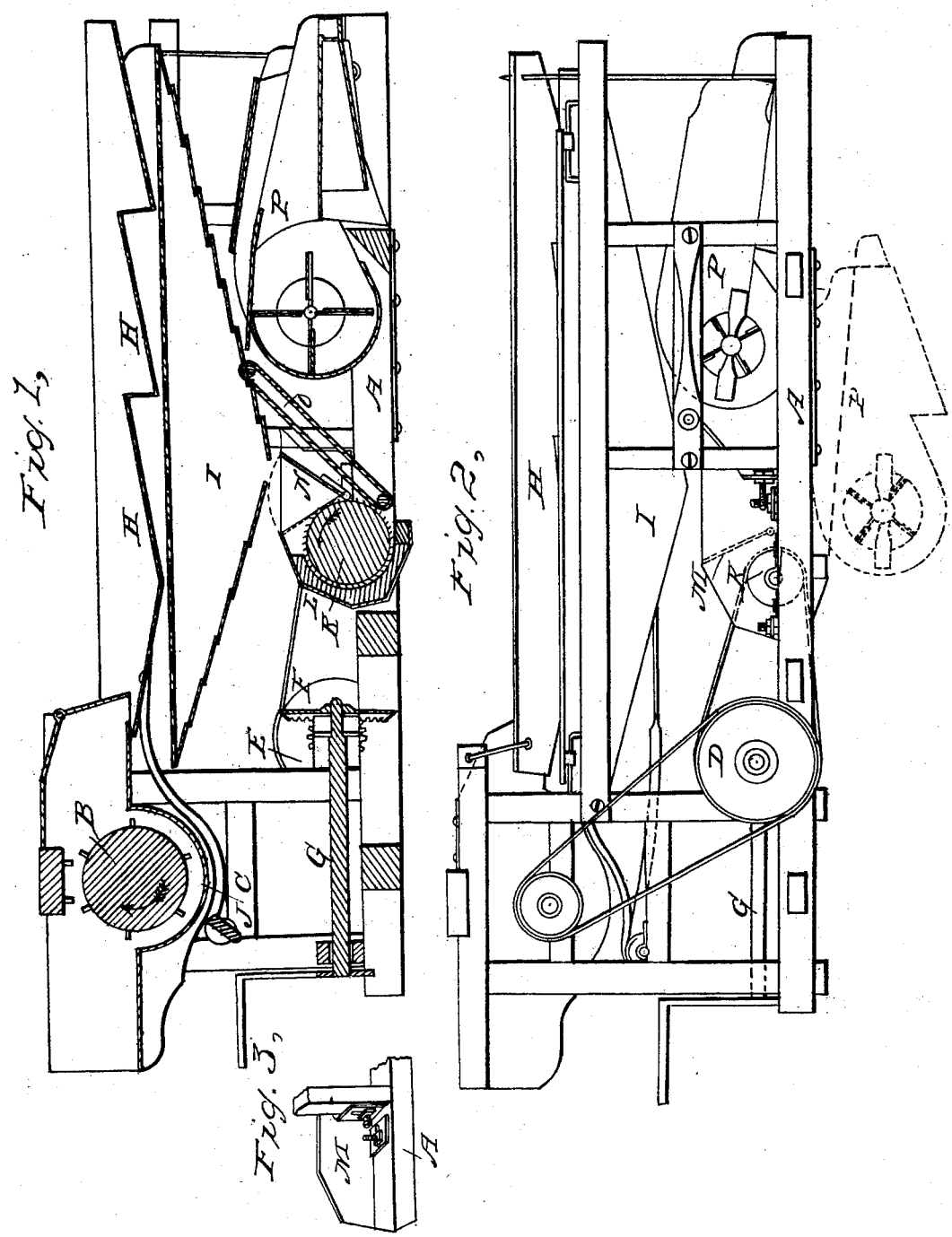

UNITED STATES PATENT OFFICE.

DARWIN SHATTUCK, OF BRANCHPORT, ASSIGNOR TO HIMSELF AND ALEXANDER F. WHITAKER, OF PENN YAN, NEW YORK.

IMPROVEMENT IN MACHINES FOR THRASHING AND CLEANING CLOVER AND GRASS SEED.

Specification forming part of Letters Patent No. 38,538, dated May 12, 1863.

*To all whom it may concern:*

Be it known that I, DARWIN SHATTUCK, of Branchport, in the county of Yates and State of New York, have invented a new and useful Machine for Thrashing Clover and Grass Seed; and I do hereby declare that the following is a full, clear, and exact description of the construction and operation of the same, reference being had to the annexed drawings, making a part of this specification, in which—

Figure 1 is a vertical longitudinal section. Fig. 2 is a side elevation.

The letters of reference refer to the same parts in each figure.

A is the frame that supports the other parts of the machine. It is made of wood, and made so as to be carried on a wagon or sleigh.

B is the thrashing-cylinder, of any ordinary construction. It is provided with teeth which pass between stationary teeth above the cylinder. It is driven in direction of the arrows, and carries the material thrashed over it, and throws the same on the separator H, thus thrashing the bolls or heads from the stalk.

C is a concave underneath the cylinder. It extends from the feed-apron to the discharge-apron. Its use is to keep all bolls or heads and stalks from falling underneath the cylinder, and allow the cylinder B to carry the same over to the separator.

D is a driving-pulley that drives the cylinder B. It is fixed on the same shaft with the bevel-pinion E. There is a corresponding pulley and pinion at the opposite side of the machine, and driven by the same wheel F.

E is a bevel-pinion on the same shaft with the pulley D. It and the corresponding one is driven by the wheel F.

F is a bevel-wheel that drives the pinion E at each side of it, and it is fixed on the shaft G at either side of the pinions, according to the direction required.

G is a driving-shaft. It may be attached to any kind of power by means of pulley yoke or clutch, and may be driven in either direction by having the wheel F put on it, so as to give the proper direction to the machine.

H is a separator that separates the bolls or heads from the stalks or straw. It is supported by hooks at the end next to the cylinder B, and the other end by props pivoted at the sides and at the sills of the frame A, and may be made adjustable at either end by having a series of holes for the supports. The bottom of the separator is perforated for bolls or seeds to pass through, and the bottom is made in sections, each inclined toward the cylinder except the first section, which is inclined downward from the cylinder B. These sections have a perpendicular connection between them, as shown in Fig. 1. This separator has a reciprocating motion given to it by means of the connection with the crank J.

I is a conveyer. The sides are made as shown in Fig. 2, and the separating portion and the bottom as shown in Fig. 1. The separating part is made on a plane and perforated with smaller holes than separator H, so as to more perfectly separate the bolls from the stalks or straw. The bottom is divided first into two sections, each inclining to the hopper of the cylinder K. Each of the sections are subdivided into many sections, as shown in Fig. 1, for the purpose of conveying the bolls or seeds to the hopper of the cylinder K. A reciprocating motion is given to it by means of a connection with one of the double cranks J. This motion, with the bottom made as specified, facilitates the motion of the bolls toward the hopper. It is supported upon slides or ways, as shown in Fig. 2.

J is a double crank secured to any convenient part of the frame A. Its use is to give a reciprocating motion to the separator H and conveyer I. It is driven by a belt over a pulley on the same shaft with pulley D and pinion E.

K is the grating-cylinder. It is driven by a belt from a pulley similar and opposite to pulley D. Its surface is covered with iron, made rough, as a rasp or grater. It rotates in direction of the arrow in Fig. 1.

L is the concave for the cylinder K. It is covered with iron inside, made rough as a rasp or grater. The concave extends about one-half the circumference of the cylinder beginning at the center above the axis of the cylinder and ending below the axis, and is supported by the side pieces, M.

M is one of the side supports of the concave, made as shown in Figs. 2 and 3. A similar one at the other side. These supports are held by bolts and nuts, as shown in Fig. 3, for the purpose of adjusting the concave to the cylinder for the various seeds and condition of the seeds. These supports constitute ends to the hopper, also to hold the back portion of the hopper N. These supports are made with ears or projection, with elongated holes through them for the purpose of allowing the concave which they hold to be adjusted in various positions with respect to the cylinder. By raising the rear ends the space above the cylinder is opened to admit more seed or bolls, and when lowered it will admit less quantity. To move the whole concave from the cylinder, loose the nuts on the bolts and move the concave back as far as required and fasten by turning the nuts tight upon the bolts. This change is necessary for the purpose of hulling the various kinds of seeds of different sizes. One end of each bolt is securely fastened to the frame of the machine, with two or more nuts on each for holding the supports M, and thereby the concave L, in any required position.

N is a portion of the hopper. It is supported at the lower edge by pivots, so as to allow it to be turned, as shown in each figure. When the machine is used for hulling, this portion of the hopper is placed as in Fig. 1, and when seed is to be thrashed, only such as timothy-seed, the portion N is placed as shown by the dotted lines in Fig. 2. When in this position it conducts the seed to the winnower, and prevents it from getting to the grating cylinder, thus changing the machine for the purpose of thrashing and cleaning the various kinds of seeds.

O is an elevator, as shown in Fig. 1. It may be driven by a belt from any part of the machinery desired. Its use is to elevate the seed from the grating-cylinder to the winnower when the winnower is placed as shown in Fig. 1; but when the winnower is placed as in Fig. 2 this elevator is not used.

P is the winnower, of any ordinary construction, except being made of such shape and dimensions that it may be placed within the frame A, and in position as shown in Fig. 1, and be made to be attached to the lower part of the frame, as shown in Fig. 2. The object in changing the position of the winnower is that it may be carried on a sleigh when placed as in Fig. 1, and on a wagon when placed as in Fig. 2, which is the most convenient and desirable position when the machine is carried on a wagon.

What I claim as my invention, and desire to secure by Letters Patent, is—

1. The conveyer I, when made and used as specified.

2. The supports M for the concave, when made with the projections and held by the bolts, as specified and used, for the purpose set forth.

3. The valve N, when used in combination with the cylinder K and concave L, to change the machine from thrashing and hulling to thrashing only without changing or stopping any other part of the machine.

DARWIN SHATTUCK.

Witnesses:
WM. COMSTOCK,
CHARLES KETCHUM.